United States Patent
Yang et al.

(10) Patent No.: US 11,868,438 B2
(45) Date of Patent: Jan. 9, 2024

(54) METHOD AND SYSTEM FOR SELF-SUPERVISED LEARNING OF PILLAR MOTION FOR AUTONOMOUS DRIVING

(71) Applicant: Beijing Qingzhouzhihang Intelligent Technology Co., Ltd, Beijing (CN)

(72) Inventors: Xiaodong Yang, Fremont, CA (US); Chenxu Luo, Beijing (CN)

(73) Assignee: BEIJING QINGZHOUZHIHANG INTELLIGENT TECHNOLOGY CO., LTD, Beijing (CN)

(*) Notice: Subject to any disclaimer, the term of this patent is extended or adjusted under 35 U.S.C. 154(b) by 363 days.

(21) Appl. No.: 17/231,271

(22) Filed: Apr. 15, 2021

(65) Prior Publication Data

US 2022/0351009 A1 Nov. 3, 2022

(51) Int. Cl.
| | |
|---|---|
| G06T 7/254 | (2017.01) |
| G06F 18/214 | (2023.01) |
| G06T 7/269 | (2017.01) |
| G01S 17/86 | (2020.01) |
| G01S 17/42 | (2006.01) |
| G01S 7/48 | (2006.01) |
| G06T 7/70 | (2017.01) |

(52) U.S. Cl.
CPC ........ *G06F 18/2155* (2023.01); *G01S 7/4808* (2013.01); *G01S 17/42* (2013.01); *G01S 17/86* (2020.01); *G06T 7/254* (2017.01); *G06T 7/269* (2017.01); *G06T 7/70* (2017.01); *G06T 2207/10028* (2013.01)

(58) Field of Classification Search
CPC .... G06F 18/2155; G01S 17/86; G01S 7/4808; G01S 17/42
See application file for complete search history.

(56) References Cited

U.S. PATENT DOCUMENTS

| | | | | |
|---|---|---|---|---|
| 2019/0384303 A1* | 12/2019 | Muller | ................... | G05D 1/027 |
| 2021/0358296 A1* | 11/2021 | Lee | ......................... | G06T 7/246 |
| 2022/0351009 A1* | 11/2022 | Yang | ....................... | G01S 17/42 |
| 2023/0206441 A1* | 6/2023 | Zhong | ................... | G06T 7/0012 |
| | | | | 382/128 |

* cited by examiner

*Primary Examiner* — Edward Park
(74) *Attorney, Agent, or Firm* — Harness, Dickey & Pierce, P.L.C.

(57) ABSTRACT

A method and a device for self-supervised learning, a storage medium, and an electronic device are provided. The method includes: organizing real points in one column along a vertical direction into a pillar; determining a predicted point in a next frame; determining a first loss term based on a minimum distance among distances between predicted points in the next frame and real points in the next frame, and generating a loss function including the first loss term; and performing self-supervised learning processing based on the loss function. A pillar motion parameter representing motion of a real point is determined with the pillar as a unit, so as to enhance correlation between point clouds. Self-supervised learning can be realized in a case of no precise correspondence between the predicted point and the real point, and training is performed based on a large number of unlabeled point clouds.

15 Claims, 5 Drawing Sheets

METHOD AND SYSTEM FOR SELF-SUPERVISED LEARNING OF PILLAR MOTION FOR AUTONOMOUS DRIVING

FIELD

The present disclosure relates to the technical field of self-supervised learning, and in particular to a method and a device for self-supervised learning, a storage medium, and an electronic device.

BACKGROUND

Understanding and predicting motion of various behavioral agents (such as vehicles, pedestrians and the like) are crucial for self-driving vehicles to operate safely in dynamic environments. A self-driving vehicle is usually equipped with multiple sensors, and the most commonly used sensor is LiDAR. How to estimate motion from point clouds collected by LiDAR is therefore one of fundamental research issues in autonomous driving. However, this is challenging in the following aspects: (1) there exist behavior agent categories and each category exhibits specific motion behavior; and (2) the point cloud is sparse and lacks of exact correspondence between sweeps.

At present, estimation of motion usually requires a large amount of annotated training data from autonomous driving scenarios. However, it is well known that manually labeling point clouds is difficult, error-prone and time-consuming. Although self-supervised learning for language and vision has gained increasing attention in recent years, self-supervised learning for point clouds still falls behind.

Another active research line is to estimate scene flow from point clouds to understand a dense 3D motion field. However, in current methods, hundreds of milliseconds are usually taken to process a partial point cloud, which is even though significantly subsampled. Moreover, these methods are available for synthetic data (for example, FlyingThings3D) or densely processed data (for example, KITTI scene flow) with an exact correspondence. However, raw point clouds scanned by LiDAR do not have such correspondence. Therefore, it is difficult to directly estimate a scene flow from LiDAR.

SUMMARY

In order to solve the problem that it is difficult to realize self-supervised learning for a point cloud, a method and a device for self-supervised learning, a storage medium, and an electronic device are provided according to embodiments of the present disclosure.

In a first aspect, a method for self-supervised learning is provided according to an embodiment of the present disclosure. The method includes: acquiring an unlabeled dataset, where the dataset includes point clouds in multiple frames, and a point cloud in each of the multiple frames includes multiple real points; organizing real points in one column along a vertical direction into a pillar, where the pillar is provided with a pillar motion parameter, and each of the real points in the pillar has a motion parameter that is the same as the pillar motion parameter; for each of real points in a current frame, moving the real point to a next frame based on a corresponding pillar motion parameter, and determining a predicted point in the next frame; determining a first loss term based on a minimum distance among distances between predicted points in the next frame and real points in the next frame, and generating a loss function including the first loss term; and performing self-supervised learning processing based on the loss function to determine a pillar motion parameter of the pillar.

In an embodiment, the determining a first loss term based on a minimum distance among distances between predicted points in the next frame and real points in the next frame includes: determining the first loss term based on a first minimum distance and/or a second minimum distance, where the first minimum distance is a minimum distance among distances from a predicted point in the next frame to multiple real points in the next frame, and the second minimum distance is a minimum distance among distances from a real point in the next frame to multiple predicted points in the next frame.

In an embodiment, the determining the first loss term based on a first minimum distance and/or a second minimum distance includes: adding a sum of first minimum distances corresponding to the multiple predicted points in the next frame to a sum of second minimum distances corresponding to the multiple real points in the next frame to obtain the first loss term according to the following equation:

$$\mathcal{L}_{consist} = \sum_{\tilde{p}_i^t \in \tilde{p}^t} \left( \min_{p_j^t \in p^t} \|\tilde{p}_i^t - p_j^t\| \right) + \sum_{p_j^t \in p^t} \left( \min_{\tilde{p}_j^t \in \tilde{p}^t} \|p_j^t - \tilde{p}_i^t\| \right)$$

where $\mathcal{L}_{consist}$ represents the first loss term, $\tilde{p}_i^t$ represents an i-th predicted point in a t-th frame, $\tilde{p}^t$ represents a set of multiple predicted points in the t-th frame, $p_j^t$ represents a j-th real point in the t-th frame, and $p^t$ represents a set of multiple real points in the t-th frame.

In an embodiment, the dataset further includes image data of the multiple frames matching the point clouds in the multiple frames, where the method further includes: projecting a real point in a target frame onto an image plane including image data to determine a first pixel, and determining an ego-optical flow of the first pixel based on a pose change of an ego-vehicle, where the target frame is the current frame or the next frame, and the first pixel is a pixel in the image data of the target frame and matching a real point in the target frame; determining an overall optical flow of the first pixel based on the image data, and determining an object optical flow of the first pixel based on the overall optical flow and the ego-optical flow; projecting a pillar motion parameter corresponding to the real point in the target frame onto the image plane, and determining a corresponding projected optical flow; and determining a second loss term based on a difference between the object optical flow and the projected optical flow, and adding the second loss term to the loss function.

In an embodiment, the determining a second loss term based on a difference between the object optical flow and the projected optical flow includes: determining the second loss term according to the following equation:

$$\mathcal{L}_{regular} = \Sigma \|\tilde{F}(u_i, v_i)^t - F_{obj}(u_i, v_i)^t\|$$

where $\mathcal{L}_{regular}$ represents the second loss term, $(u_i, v_i)^t$ represents a first pixel in a t-th frame corresponding to an i-th real point $p_i^t$, $\tilde{F}(u_i, v_i)^t$ represents a projected optical flow of the first pixel $(u_i, v_i)^t$, and $F_{obj}(u_i, v_i)^t$ represents an object optical flow of the first pixel $(u_i, v_i)^t$.

In an embodiment, the dataset further includes image data of the multiple frames matching the point clouds in the multiple frames. The method further includes: projecting a real point in a target frame onto an image plane including image data to determine a first pixel, and determining an ego-optical flow of the first pixel based on a pose change of an ego-vehicle, where the target frame is the current frame or the next frame, and the first pixel is a pixel in the image data of the target frame and matching a real point in the target frame; determining an overall optical flow of the first pixel based on the image data, and determining an object optical flow of the first pixel based on the overall optical flow and the ego-optical flow; and determining a probability that the first pixel corresponds to a dynamic object based on magnitude of the object optical flow, to determine a probability that a real point in the target frame corresponding to the first pixel corresponds to the dynamic object, where the probability is positively correlated to the magnitude of the object optical flow. The determining a first loss term based on minimum distances among distances between predicted points in the next frame and real points in the next frame includes: weighting, with the probability that the real point corresponds to the dynamic object as a weighting coefficient, minimum distances between predicted points in the next frame and real points in the next frame, and determining the first loss term based on a minimum distance obtained from weighting.

In an embodiment, the determining a probability that the first pixel corresponds to a dynamic object based on magnitude of the object optical flow includes: determining the probability that the first pixel corresponds to the dynamic object according to the following equation:

$$s_i^t = 1 - \exp\{-\alpha \max(\|F_{obj}(u_i, v_i)^t\| - \tau, 0)\}$$

where $(u_i, v_i)^t$ represents a first pixel in a t-th frame corresponding to an i-th real point, $F_{obj}(u_i, v_i)^t$ represents an object optical flow of the first pixel $(u_i, v_i)^t$, $s_i^t$ represents a probability that the first pixel $(u_i, v_i)^t$ corresponds to a dynamic object, $\alpha$ is a smoothing factor, and $\tau$ is a tolerance.

In an embodiment, the projecting a real point in a target frame onto an image plane including image data to determine a first pixel, and determining an ego-optical flow of the first pixel based on a pose change of an ego-vehicle includes: determining a relative pose $T_{L \to C}$ between LiDAR for collecting the point cloud and a camera for collecting the image data, and determining an inherent parameter K of the camera; projecting the real point in the target frame onto the image plane including the image data based on the relative pose and the inherent parameter, to determine the first pixel; determining the pose change $T_{t \to t+1}$ of the ego-vehicle in the target frame, and determining the ego-optical flow of the first pixel according to the following equation:

$$F_{ego}(u_i, v_i)^t = KT_{L \to C} T_{t \to t+1} p_i^t - (u_i, v_i)^t$$

where $p_i^t$ represents an i-th real point in the t-th frame, $(u_i, v_i)^t$ represents a first pixel in the t-th frame corresponding to the i-th real point, and $F_{ego}(u_i, v_i)^t$ represents an ego-optical flow of the first pixel $(u_i, v_i)^t$.

In an embodiment, a component of the pillar motion parameter in the vertical direction is zero.

In an embodiment, the method further includes: generating a pillar motion field, where the pillar motion field includes pillar motion parameters of multiple pillars; and determining a third loss term based on components and gradients of the pillar motion field in multiple directions, and adding the third loss term to the loss function.

In an embodiment, the determining a third loss term based on components and gradients of the pillar motion field in multiple directions includes: determining components and gradients of the pillar motion field in an x direction and a y direction in a horizontal plane, and determining the third loss term according to the following equation:

$$\mathcal{L}_{smooth} = |\nabla_x \mathcal{M}_x^t| + |\nabla_y \mathcal{M}_x^t| + |\nabla_x \mathcal{M}_y^t| + |\nabla_y \mathcal{M}_y^t|$$

where $\mathcal{M}_x^t$ represents a component of a pillar motion field of a t-th frame in the x direction, $\mathcal{M}_y^t$ represents a component of the pillar motion field of the t-th frame in the y direction, $\nabla_x$ represents a gradient in the x direction, $\nabla_y$ represents a gradient in the x direction.

In an embodiment, the generating a loss function including the first loss term includes: in a case of other loss term than the first loss term, setting a balance coefficient for the first loss term and the other loss term, and generating the loss function.

In a second aspect, a device for self-supervised learning is further provided according to an embodiment of the present disclosure. The device includes an acquisition module, a pillar module, a prediction module, a loss determination module and a processing module. The acquisition module is configured to acquire an unlabeled dataset, where the dataset includes point clouds in multiple frames, and a point cloud in each of the multiple frames includes multiple real points. The pillar module is configured to organize real points in one column along a vertical direction into a pillar, where the pillar is provided with a pillar motion parameter, and each of the real points in the pillar has a motion parameter that is the same as the pillar motion parameter. The prediction module is configured to, for each of real points in a current frame, move the real point to a next frame based on a corresponding pillar motion parameter, to determine a predicted point in the next frame. The loss determination module is configured to determine a first loss term based on a minimum distance among distances between predicted points in the next frame and real points in the next frame, and generate a loss function including the first loss term. The processing module is configured to perform self-supervised learning processing based on the loss function to determine a pillar motion parameter of the pillar.

In a third aspect, a computer-readable storage medium is further provided according to an embodiment of the present disclosure. The computer-readable storage medium stores a computer program that, when being executed by a processor, causes steps in the method for self-supervised learning according to any one of the above embodiments to be implemented.

In a fourth aspect, an electronic device is further provided according to an embodiment of the present disclosure. The electronic device includes a bus, a transceiver, a memory, a processor, and a computer program stored in the memory and executed on the processor. The transceiver, the memory and the processor are connected to each other via the bus. The processor, when executing the computer program, implements steps in the method for self-supervised learning according to any one of the above embodiments.

In the solutions provided in the first aspect of the embodiments of the present disclosure, real points in each pillar have the same pillar motion parameters. Predicted points are obtained based on the pillar motion parameters, and the loss function is generated based on the minimum distance among distances between the predicted points and the real points to realize self-supervised learning. With this method, the real points are organized into the corresponding pillar, and the pillar motion parameter representing motion of the real point is determined with the pillar as a unit, so as to enhance correlation between point clouds. Self-supervised learning can be realized in a case of no precise correspondence between the predicted point and the real point, and training is performed based on a large number of unlabeled point clouds. Moreover, in this method, it is unnecessary to distinguish a category of an object, so that the motion that is not related to the category is estimated based on the point cloud.

In order to make the above objectives, features and advantages of the present disclosure more comprehensible, preferred embodiments together with the drawings are described in detail below.

BRIEF DESCRIPTION OF THE DRAWINGS

The drawings to be used in the description of the embodiments or the conventional technology are described briefly as follows, so that the technical solutions according to the embodiments of the present disclosure or according to the conventional technology become clearer. It is apparent that the drawings in the following description only illustrate some embodiments of the present disclosure. For those skilled in the art, other drawings may be obtained according to these drawings without any creative work.

DETAILED DESCRIPTION OF EMBODIMENTS

Hereinafter, the embodiments of the present disclosure are described in conjunction with the drawings in the embodiments of the present disclosure.

Figure 1:
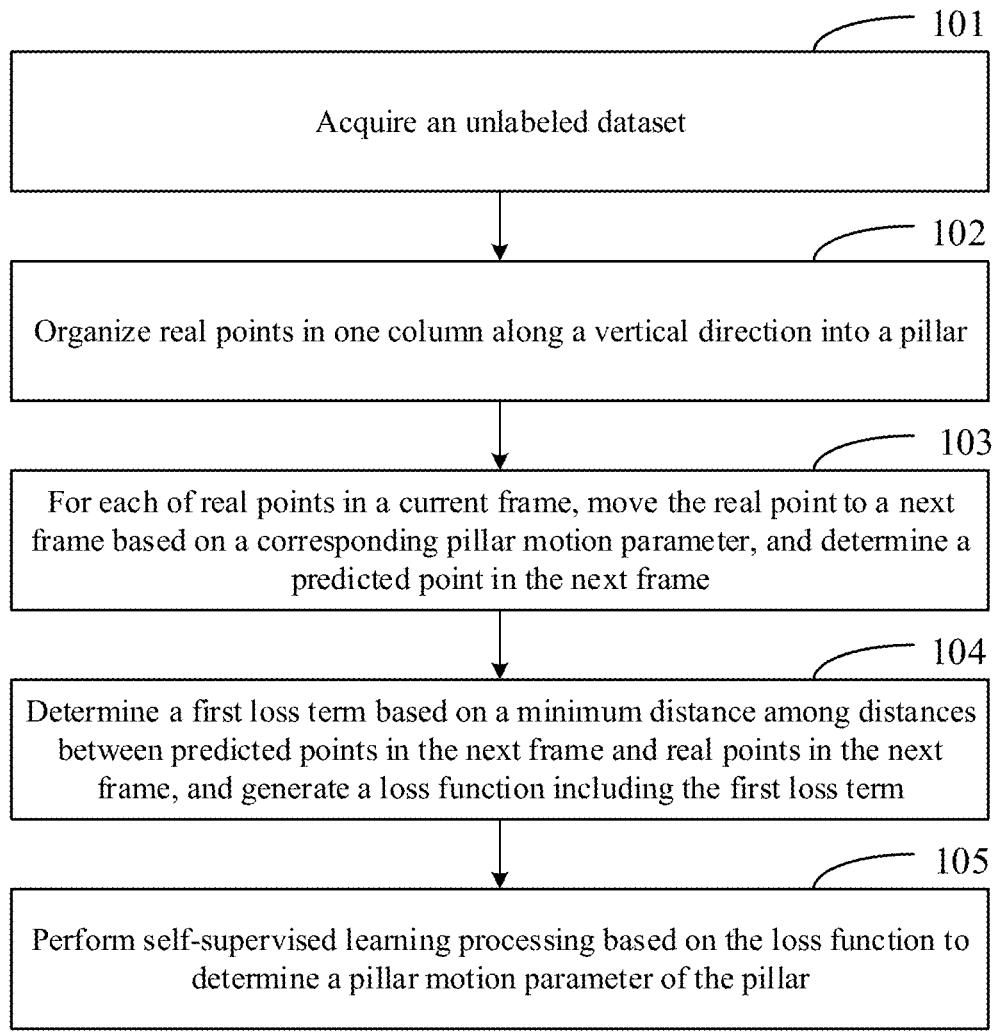
FIG. 1 shows a flow chart of a method for self-supervised learning according to an embodiment of the present disclosure.

A method for self-supervised learning is provided according to an embodiment of the present disclosure to realize self-supervised learning between point clouds in an automatic driving scenario. FIG. 1 shows a flow chart of a method for self-supervised learning according to an embodiment of the present disclosure. As shown in FIG. 1, the method includes following steps 101 to 105.

In step 101, an unlabeled dataset is obtained, where the dataset includes point clouds of multiple frames, and a point cloud of each of frames includes multiple real points.

In the embodiment of the present disclosure, the dataset is obtained based on pre-collected data, and the point clouds included in the dataset are collected by a LiDAR. The LiDAR scans every a time period (such as 50 ms) to form a point cloud of a frame, and a point cloud of each of frames corresponds to a timestamp. A point cloud of each of frames includes multiple points. Since the points included in point clouds are actually collected, the points are called "real points." For example, the point cloud may be obtained by sensors such as a LiDAR on an ego-vehicle, where the self-vehicle may be an ego-vehicle. The point clouds of the multiple frames included in the dataset are continuous, that is, the point clouds of the multiple frames correspond to a same time period, and there is no phenomenon of missing a point cloud of a frame.

In addition, in the method, unlabeled point clouds are used to realize self-supervised learning, thus there is no labels for marking real points in a point cloud by manual labeling. For example, the point cloud may be an original point cloud that has not been processed after being collected.

In step 102, real points in one column along a vertical direction are organized into a pillar, where the pillar is configured with a pillar motion parameter, and each of the real points in the pillar has a motion parameter same as the pillar motion parameter.

The point cloud has sparsity, and objects such as pedestrians and other vehicles scanned by LiDARs may be moving due to that the ego-vehicles may be moving in the automatic driving scenario, thus there is no precise corresponding relationship between point clouds of two frames, that is, it is difficult to determine a real point in a point cloud of a frame corresponds to which real point in a point cloud of another frame. In the embodiment of the present disclosure, motion of a real point is described based on a pillar to enhance the association between the point clouds of the two frames.

In the embodiment of the present disclosure, the objects in the automatic driving scenario mainly move in the horizontal direction, and move very little or do not move in the vertical direction. In addition, the motion of the objects in the same pillar has consistency, that is, the objects in the same pillar may move synchronously. Based on the consistency, the self-supervision learning of point cloud is achieved.

Figure 2:
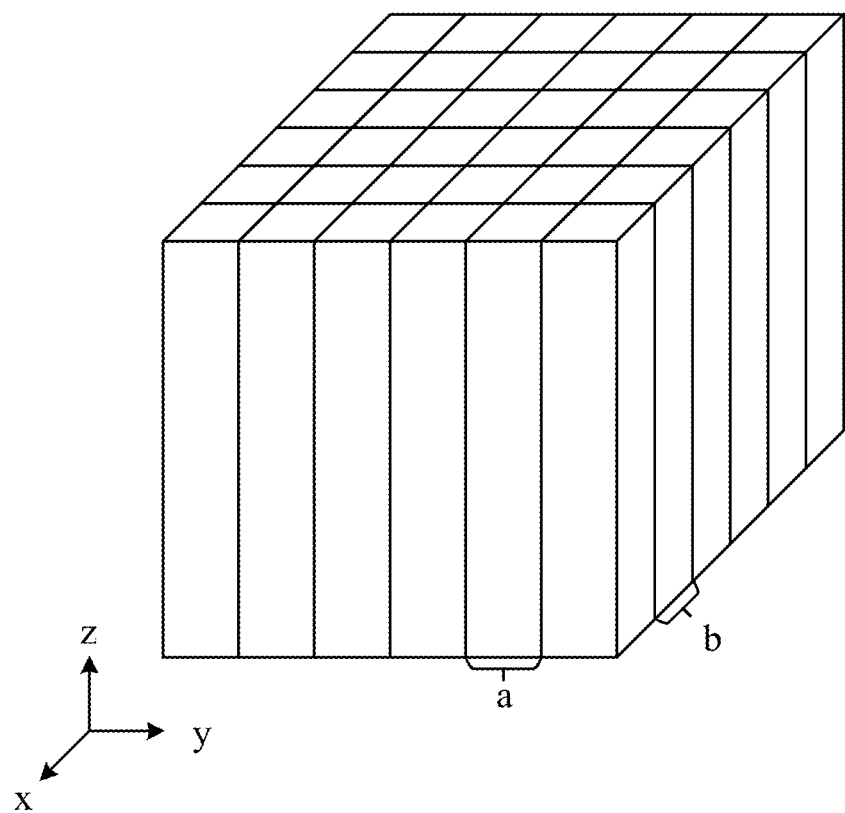
FIG. 2 shows a schematic diagram of defining a pillar in a method for self-supervised learning according to an embodiment of the present disclosure.

Specifically, a three-dimensional space is divided into multiple pillars along a vertical direction. For example, as shown in FIG. 2, a horizontal plane in the three-dimensional space is divided into a*b squares, and for each of the squares, a space along a vertical direction (that is, a direction of a z-axis) corresponding to the square forms a pillar. For a point cloud of each of frames, real points in one column along the vertical direction are located in a pillar, thus the real points in the column may be organized into the pillar. Moreover, objects in a pillar have consistency, thus real points in the pillar have consistency, that is, all the real points in the pillar have same motion. In the embodiment of the present disclosure, the motion of the points in a point cloud is represented by pillar motion. In addition, a pillar motion parameter indicates motion of a pillar, and all the real points in the pillar perform motion based on the pillar motion parameter. The pillar motion parameter may be a two-dimensional motion vector (motion vector), for example, may include a motion speed and a motion direction. Optionally, the motion of the pillar in the vertical direction may be ignored, that is, a component of the pillar motion parameter in the vertical direction is equal to zero, thereby simplifying calculation and improving processing efficiency.

In step 103, for each of real points in a current frame, the real point is moved to a next frame based on a pillar motion parameter to determine a predicted point in a next frame.

In the embodiment of the present disclosure, the pillar motion parameter represents motion of each of real points in a pillar. A timestamp of each of frames corresponds to a pillar motion parameter. Each of the real points in the current frame is located in a pillar, thus a pillar motion parameter corresponding to the real point may be determined, and then the real point may be moved to the next frame based on the pillar motion parameter. In the embodiment of the present disclosure, that a real point "is moved to the next frame" indicates that the real point is moved from a timestamp of the current frame to a timestamp of the next frame in time dimension. In addition, the real point is moved based on the pillar motion parameter, for example, the real point may be moved for a distance in a direction or may be not moved, so that the position of the real point in the next frame may be determined. The real point that is moved to the next frame is called the predicted point in the next frame.

For example, the current frame is a t-th frame, and a real point p in the t-th frame corresponds to a pillar motion parameter M of the t-th frame, then the real point p is moved to the next frame based on the pillar motion parameter M, that is, the real point p is moved to a (t+1)th frame. Thus, the position of the real point p of the t-th frame in the (t+1)th frame may be determined, thereby determining the predicted point in the (t+1)th frame.

In step 104, a first loss term is determined based on a minimum distance between predicted points in the next frame and real points in the next frame, and a loss function including the first loss term is generated.

In the embodiment of the present disclosure, the dataset includes at least a point cloud of the current frame and a point cloud of the next frame. Based on step 103, each of the real points in the current frame may be converted into a predicted point in the next frame, that is, a point cloud including multiple real points may be converted into a point cloud including multiple predicted points, and the point cloud including multiple predicted points is called a predicted point cloud of the next frame. The dataset includes a point cloud of the next frame that is actually collected, that is, a real point cloud of the next frame. In a case that the pillar motion parameter is correct, the predicted point cloud of the next frame is similar to or even the same as the real point cloud of the next frame. As mentioned above, it is difficult to determine which real point in the next frame corresponds to a predicted point in the next frame due to that there is no precise corresponding relationship between point clouds of two frames. However, in the embodiment of the present disclosure, all the real points in a pillar have the same motion parameter, and there is a strong corresponding relationship between a pillar corresponding to the predicted points in the next frame and a pillar corresponding to the real points of the next frame, that is, there is structural consistency between the predicted point cloud in the next frame and the real point cloud in the next frame. Therefore, self-supervised learning is performed based on the structural consistency, the motion of the pillar can be learned, that is, the pillar motion parameter can be learned.

In the embodiment of the present disclosure, the next frame includes multiple predicted points and multiple real points, and a loss term, that is, the first loss term, is determined based on a minimum distance between the prediction points in the next frame and the real points in the next frame, and then a loss function required in the self-supervised learning is generated based on the loss term.

In an embodiment, the above step in which "a first loss term is determined based on a minimum distance between the predicted points in the next frame and real points in the next frame" may include a step A1.

In step A1, the first loss term is determined based on a first minimum distance and/or a second minimum distance. The first minimum distance is a minimum distance between a predicted point in the next frame and multiple real points in the next frame. The second minimum distance is a minimum distance between a real point in the next frame and multiple predicted points in the next frame.

In the embodiment of the present disclosure, the next frame includes multiple predicted points and multiple real points. For a predicted point, a minimum distance between the predicted point and multiple real points, that is, the first minimum distance, may be determined. For a real point, a minimum distance between the real point and multiple predicted points, that is, the second minimum distance, may be determined. In the embodiment of the present disclosure, the first loss term is determined based on the first minimum distance or the second minimum distance; or the first loss term is determined based on the first minimum distance and the second minimum distance. The first loss term may represent a structural consistency loss.

In an embodiment, in order to ensure strong correspondence between predicted points and real points, in the embodiments of the present disclosure, the first loss term is determined based on the first minimum distance and the second minimum distance.

A process of determining the first loss term includes: calculating the first loss term by adding a sum of first minimum distances respectively corresponding to the multiple predicted points in the next frame to a sum of second minimum distances respectively corresponding to the multiple real points in the next frame, and the process is expressed as:

$$\mathcal{L}_{consist} = \sum_{\tilde{p}_i \in \tilde{p}} \min_{p_j \in p} \|\tilde{p}_i - p_j\| + \sum_{p_j \in p} \min_{\tilde{p}_i \in \tilde{p}} \|p_j - \tilde{p}_i\|. \quad (1)$$

where, $\mathcal{L}_{consist}$ represents the first loss term, $\tilde{p}_i^t$ represents an (i)th predicted point in the t-th frame, $\tilde{p}^t$ represents a set of multiple predicted points in the t-th frame, $p_j^t$ represents a (j)th real point in the t-th frame, and $p^t$ represents a set of multiple real points in the t-th frame.

In the embodiments of the present disclosure, for each frame, the first loss term is calculated according to the above equation (1). Taking a case in which the t-th frame serves as the next frame as an example, multiple real points form the set $p^t$ and multiple predicted points form the set $\tilde{p}^t$. The above two sets may include all points in the t-th frame. For example, $p^t$ includes all real points in the (t) frame. Alternatively, the above two sets may include only part of points in the t-th frame. For example, $p^t$ includes all real points in a pillar corresponding to the predicted point $\tilde{p}_i^t$. A minimum distance between the (i)th predicted point $\tilde{p}_i^t$ and the multiple real points is expressed as $$\min_{p_j^t \in p^t} \|\tilde{p}_i^t - p_j^t\|$$

and a minimum distance between the (j)th real point $p_j^t$ and the multiple predicted points is expressed as $$\min_{\tilde{p}_i^t \in \tilde{p}^t} \|p_j^t - \tilde{p}_i^t\|,$$

such that the first loss term is calculated according to the equation (1) and a loss function including the first loss term is determined.

In step 105, self-supervised learning is performed according to the loss function to determine a motion parameter of the pillar.

In the embodiments of the present disclosure, after the loss function is determined, training process is performed with the conventional method for self-supervised learning to finally determine the motion parameter of the pillar, that is, a pillar motion parameter. Pillar motion parameters of multiple pillars form a pillar motion field. Motion of each pillar can be predicted based on the pillar motion field, that is, motion of objects in each pillar can be determined. In addition, even if there are different categories of objects such as a vehicle, a pedestrian and a building, in the embodiments of the present disclosure, these different categories of objects respectively correspond to corresponding pillars. Therefore, in the embodiments of the present disclosure, motion of pillars is focused on and motion of objects can be predicted without distinguishing categories of the objects, thereby estimating class-agnostic motion based on point clouds.

A method for self-supervised learning is provided according to the embodiments of the present disclosure. For each pillar, real points in the pillar have the same pillar motion parameter. Predicted points are obtained based on the pillar motion parameter. The loss function is established based on minimum distances between the predicted points and the real points, thereby realizing self-supervised learning. With the method, the real points are organized into corresponding pillars, and the pillar motion parameter representing motion of the real points is determined based on the pillars, so as to enhance correlation between point clouds. Self-supervised learning can be realized without exact correspondence between the predicted points and the real points. Therefore, training can be performed by means of a large number of unlabeled point clouds. Moreover, with the method, class-agnostic motion can be estimated based on the point clouds without distinguish the categories of the objects.

Although the pillars enhance structural consistency between the point clouds, the structural consistency still depends on correspondence between two consecutive point clouds (for example, a point cloud in the t-th frame and a point cloud in the (t+1)th frame). The point cloud is sparse, especially a distant point cloud in which points are so sparse that real points in a current frame cannot accurately correspond to real points in a next frame, that is, predicted points in the next frame cannot accurately correspond to the real points in the next frame. The above loss term determined based on the minimum distances may be inaccurate (ambiguous).

Therefore, the above structural consistency matching based on pillars inevitably introduces noise. For example, a pillar motion parameter of a static object (such as a building) should be zero, but due to the noise, it may be considered that the static object moves slightly. In the embodiments of the present disclosure, the structural consistency is complemented based on image data matching the point clouds, to mitigate ambiguity caused by sparseness of the point cloud.

The dataset in the embodiments of the represent disclosure further includes multiple frames of image data matching the point cloud. For example, each frame of point cloud corresponds to corresponding image data. The image data may be collected by an imaging device paired with a LiDAR. The imaging device may be a camera. For example, the ego-vehicle is provided with multiple LiDAR and camera devices. The LiDAR and the imaging device perform collection at an interval of one timestamp, for example, at an interval of 20 ms. The LiDAR collects a point cloud at each timestamp, that is, a point cloud in each frame. The imaging device collects image data at each timestamp, that is, image data in each frame.

Figure 3:
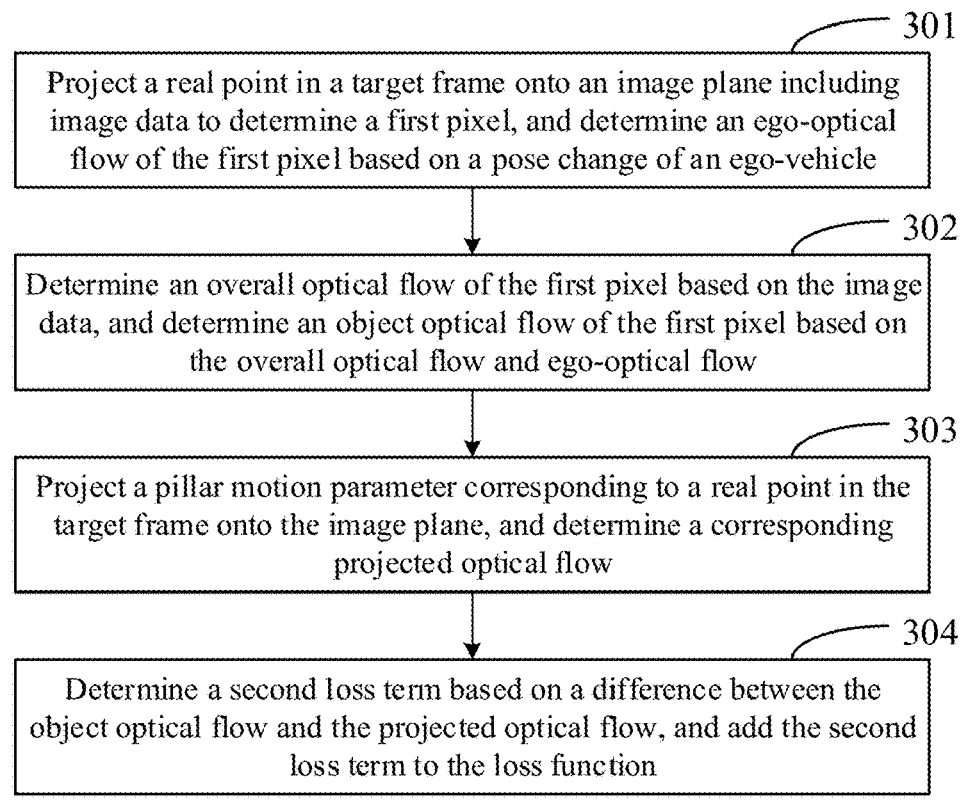
FIG. 3 shows a flow chart of determining a regularization loss according to an embodiment of the present disclosure.

There is a scheme of estimating a scene flow based on an image. However, as described in the background, it is difficult and inaccurate to estimate the scene flow directly. Therefore, in the embodiments of the present disclosure, an optical flow is utilized for cross-sensor self-supervised motion regularization. Motion learning is regularized across sensors, thereby mitigating the problem of lack of accurate correspondence between sweeps. In the embodiments of the present disclosure, in addition to generating the first loss term, a second loss term corresponding to a target frame is calculated by regarding the current frame or the next frame as the target frame, and the second loss term serves as regularization. As shown in FIG. 3, the regularization process includes steps 301 to 304.

In step 301, real points of the target frame are projected onto an image plane where the image data is located. A first pixel point is determined, and an ego-optical flow of the first pixel point is determined based on a pose change of the ego-vehicle. The current frame or the next frame serves as the target frame. The first pixel point is a pixel point that is in the image data of the target frame and matches the real point of the target frame.

In step 302, an overall optical flow of the first pixel point is determined based on the image data, and an object optical flow of the first pixel point is determined based on the overall optical flow and the ego-optical flow.

In the embodiments of the present disclosure, the image data is two-dimensional data and corresponds to a plane, that is, the image plane. The pixel point in the image plane matching the real point, that is, the first pixel point, may be determined by projecting the real point in the target frame onto the image data in the target frame. For example, in a case that the t-th frame serves as the target frame and the (i)th real point $p_i^t$ in the target frame matches a pixel point $(u_i, v_i)^t$ in the image data, the pixel point $(u_i, v_i)^t$ is the first pixel point. Those skilled in the art can understand that step 301 may be performed for each frame and the current frame or the next frame may serve as the target frame in determining the first loss term based on the predicted points in the next frame and the real points in the next frame. The first pixel point refers to a category of pixel points, that is, pixel points that correspond to real points. Due to sparsity of the point cloud, some pixel points in the image data may not correspond to the real points, and these pixel points cannot refer to the first pixel point.

In the embodiments of the present disclosure, a relative position of the LiDAR for collecting a point cloud and the imaging device for collecting image data is fixed. Therefore, the correspondence between the real point and the first pixel point can be determined based on a relative pose $T_{L \to C}$ between the LiDAR and the imaging device, and thus a real point is corresponded to a first pixel point. For example, the (i)th real point in the t-th frame is $p_i^t$. The point $p_i^t$ is three-dimensional, that is, $p_i^t \in \mathbb{R}^3$. If the relative pose between the LiDAR and the imaging device is expressed as $T_{L \to C}$ and intrinsic parameters (including an internal parameter, an external parameter, and the like) of the imaging device is expressed as K, the first pixel point $(u_i, v_i)^t$ corresponding to the real point is calculated by:

$$(u_i, v_i)^t = KT_{L \to C} p_i^t \quad (2)$$

The optical flow estimation is relatively accurate. However, the optical flow (the overall optical flow) determined based on the image data includes an optical flow caused by motion of the ego-vehicle (that is, the ego-optical flow) and the optical flow caused by the motion of the object (that is, the object optical flow). Therefore, the overall optical flow cannot directly represent the motion of the object, and it is required to factorize the motion of the ego-vehicle out from the overall optical flow. In the embodiments of the present disclosure, when the ego-vehicle collects the point cloud and image data, a pose of the ego-vehicle changes and a change of the pose represents motion of the ego-vehicle. Therefore, the ego-optical flow of the first pixel point can be determined based on the change of the pose. For example, in a case that the t-th frame serves as the target frame and a pose change of the ego-vehicle from the t-th frame to the (t+1)th frame serves as a pose change $T_{t \rightarrow t+1}$ in the target frame, a location of the first pixel point corresponding to the real point $p_i^t$ at the t-th frame is $(u_i, v_i)^t$. In the (t+1)th frame, a change caused by the ego-vehicle causes the first pixel point to move to a location $KT_{L \rightarrow C}T_{t \rightarrow t+1}p_i^t$, such that the ego-optical flow $F_{ego}(u_i, v_i)^t$ of the first pixel point is calculated by:

$$F_{ego}(u_i,v_i)^t = KT_{L \rightarrow C}T_{t \rightarrow t+1}p_i^t - (u_i,v_i)^t \quad (3)$$

In addition, the overall optical flow of the first pixel point can be determined based on image data in two consecutive frames. For example, the overall optical flow of the first pixel point in the t-th frame may be determined based on image data in the t-th frame and image data in the (t+1)th frame. If the overall optical flow of the first pixel point $(u_i, v_i)^t$ in the t-th frame is expressed as $F(u_i, v_i)^t$ and an object optical flow of the first pixel point $(u_i, v_i)^t$ in the t-th frame is expressed as $F_{obj}(u_i, v_i)^t$, relationship between the overall optical flow, the ego-optical flow and the object optical flow of the first pixel point is expressed as:

$$F(u_i,v_i)^t = F_{ego}(u_i,v_i)^t + F_{obj}(u_i,v_i)^t \quad (4)$$

According to the above equations (3) and (4), the object optical flow $F_{obj}(u_i, v_i)^t$ of the first pixel point can be determined. The object optical flow is a remaining part after factorizing out the ego-optical flow out from the overall optical flow. Since only the ego-optical flow of the first pixel point corresponding to the real point is determined, that is, only the first pixel point is compensated to determine the object optical flow, an object optical flow of a pixel point in the image data other than the first pixel point cannot be determined.

In step 303, pillar motion parameter corresponding to the real point in the target frame is projected onto the image plane to determine a projection optical flow.

In the embodiments of the present disclosure, as shown in the above equation (2), there is correspondence between the real point and the first pixel point. The pillar motion parameter of the real point may be projected onto the image plane according to the above equation (2), and thus the three-dimensional pillar motion parameter may be projected onto the two-dimensional image plane. Projected pillar motion parameter represents the motion of the pillar in the image plane and refers to the projection optical flow in the embodiments of the present disclosure.

In step 304, the second loss term is determined based on a difference between the object optical flow and the projection optical flow, and the second loss term is added to the loss function.

In the embodiments of the present disclosure, the projection optical flow is determined by projecting the pillar motion parameter onto the image plane and the projection optical flow is predicted based on the pillar motion parameter. The object optical flow is determined based on the image data and the pose change of the ego-vehicle and the object optical flow is real. Therefore, a correlation between pillar motion and optical flow can be established based on the difference between the object optical flow and the projection optical flow. The difference also represents a difference between the pillar motion parameter and the real motion. The second loss term is determined based on the difference. The second loss term includes losses of two sensors, that is, losses of the LiDAR and the imaging device. Self-supervised learning is performed based on the loss function including the second loss term, which causes the predicted projection optical flow to be close to the real object optical flow.

In an embodiment, the second loss term determined in the above step 304 may be expressed as:

$$\mathcal{L}_{regular} = \Sigma \|\tilde{F}(u_i,v_i)^t - F_{obj}(u_i,v_i)^t\| \quad (5)$$

where $\mathcal{L}_{regular}$ represents the second loss term, $(u_i, v_i)^t$ represents the first pixel point corresponding to the (i)th real point $p_i^t$ in the t-th frame, $\tilde{F}(u_i, v_i)^t$ represents the projection optical flow of the first pixel point $(u_i, v_i)^t$, and $F_{obj}(u_i, v_i)^t$ represents the object optical flow of the first pixel point $(u_i, v_i)^t$.

In the embodiments of the present disclosure, the second loss term which is the cross-sensory loss serves as an auxiliary regularization to complement the structural consistency (that is, the first loss term) and mitigate lack of correspondence between point clouds due to sparsity of the point clouds. In addition, the regularization guided by the optical flow can be regarded as motion knowledge from the imaging device to the LiDAR during training, which enhances effect of the self-supervised learning.

Figure 4:
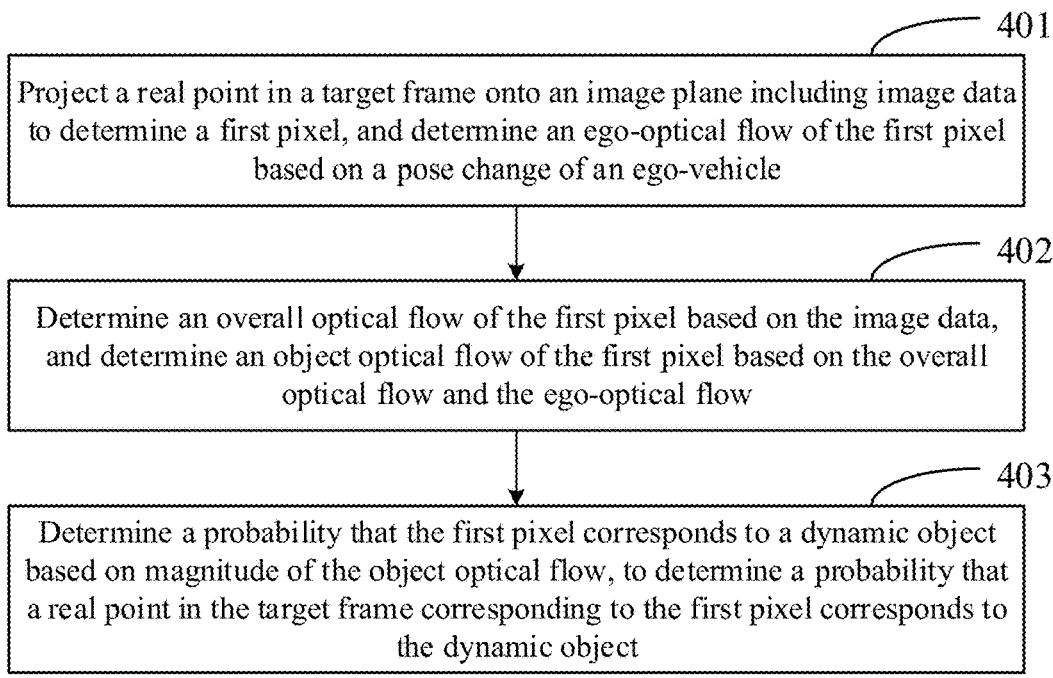
FIG. 4 shows a flow chart of determining a probability of a real point corresponding to a dynamic object according to an embodiment of the present disclosure.

In an embodiment, the ego-vehicle generally moves in actual scanning of the LiDAR, and real points included in a pillar of a static object are different in point clouds respectively in two consecutive frames, resulting in that noise is introduced to the static objects when the nearest neighbor matching is enforced based on the above first loss term. In the embodiments of the present disclosure, influence of the above noise is reduced by introducing a probability that each real point is dynamic, thereby enhancing the first loss term. In the embodiments of the present disclosure, the influence of the noise is reduced based on multiple frames of image data matching the point cloud. As shown in FIG. 4, the method further includes the following steps 401 to 403, and the process of determining the first loss term in the above step 104 further includes the following step B1.

In step 401, a first pixel point is determined by projecting a real point of the target frame onto an image plane where the image data locates, and an egoistic optical flow of the first pixel point is determined based on the change in pose of the egoistic vehicle. The target frame is the current frame or the next frame, and the first pixel point is the pixel point that matches the real point of the target frame in the image data of the target frame.

In step 402, an overall optical flow of the first pixel point is determined based on the image data, and an object optical flow of the first pixel point is determined based on the overall optical flow and the egoistic optical flow.

In the embodiment of the present disclosure, the steps 401 to 402 form a process of determining the object optical flow, which is the same as the process indicated by the above-mentioned steps 301 to 302 and is not repeated hereinafter. Moreover, if the second loss term is required to be added into the loss function, either steps 301 to 302 or steps 401 to 402 may be executed, that is, the process of determining the object optical flow needs to be executed only once.

In step 403, a probability that the first pixel point corresponds to a dynamic object is determined based on the magnitude of the optical flow of the object, thereby determining a probability that the real point of the target frame corresponding to the first pixel point corresponds to the dynamic object. The probability is positively correlated with the magnitude of the object optical flow.

In the embodiment of the present disclosure, the object optical flow may represent a movement of an object. If the object is static, the magnitude of the object optical flow should be zero. In a case where the object is dynamic, the greater the displacement of the object, the greater the magnitude of the object optical flow. Therefore, the greater the magnitude of the object optical flow, the greater the probability that the corresponding object is dynamic, that is, there is a positive correlation between the probability and the magnitude of the object optical flow. Because of the correspondence of the first pixel point and the real point, the "probability that the first pixel point corresponds to a dynamic object" is equal to the corresponding "probability that the real point of the target frame corresponds to the dynamic object," and thereby both the probabilities are positively correlated with the magnitude of the object optical flow.

In the embodiment of the present disclosure, the norm of the object optical flow may be taken as the magnitude of the object optical flow, that is, the magnitude of the object optical flow $F_{obj}(u_i, v_i)^t$ is equal to $\|F_{obj}(u_i, v_i)^t\|$. Alternatively, since an error is unavoidable when calculating the object optical flow, a tolerance $\tau$ is preset, which may be fixed, according to the embodiment of the present disclosure. The probability is set to 0 when the magnitude of the object optical flow is less than the tolerance $\tau$, which indicates that the object is considered static at this time. Specifically, the probability may be calculated as $\max(\|F_{obj}(u_i, v_i)^t\|-\tau, 0)$. For example, the probability that the first pixel point corresponds to a dynamic object is calculated with the following equation:

$$s_i^t = 1 - \exp\{-\alpha \max(\|F_{obj}(u_i, v_i)^t\| - \tau, 0)\} \quad (6)$$

where $(u_i, v_i)^t$ represents the first pixel point corresponding to the $i^{th}$ real point in the $t^{th}$ frame, $F_{obj}(u_i, v_i)^t$ represents the object optical flow of the first pixel point $(u_i, v_i)^t$, $s_i^t$ represents the probability that the first pixel point $(u_i, v_i)^t$ corresponds to a dynamic object, $\alpha$ represents a smoothing factor, and T represents the tolerance which is generally fixed.

When, for each real point, the probability that the real point corresponds to a dynamic object is determined, the above-mentioned first loss term may be adjusted. In the embodiment of the present disclosure, the process of determining the first loss term in step 104 further includes step B1 as follows.

In step B1, the minimum distance between a predicted point of the next frame and the real point of the next frame is weighted using the probability that the real point corresponds to a dynamic object as a weighting coefficient, and the first loss term is determined based on the weighted minimum distance item.

In the embodiment of the present disclosure, a real point to which the dynamic object corresponds has a relatively high weight in training by weighting the minimum distance using the probability that the real point corresponds to a dynamic object as the weighting coefficient, and the weight of a real point in the static pillar is decreased by the probabilistic motion mask so as to reduce the influence of noise introduced by the static pillar. In addition, in a scene of autonomous driving, there will be more points of a static object in the point cloud than points of a dynamic object. For example, there are relatively few points corresponding to a dynamic vehicle and a pedestrian, while there are relatively many points corresponding to a static building. In other words, the static object or static pillar dominates. Therefore, this weighting strategy further helps to balance the contributions of static pillars and dynamic pillars when calculating the structural consistency loss (that is, the first loss term).

For example, if the probability that the $j^{th}$ real point of the $t^{th}$ frame corresponds to a dynamic object is represented by $s_j^t$, then the above equation (1) may be weighted to determine the first loss term as:

$$\mathcal{L}_{consist} = \sum\nolimits_{\hat{p}_i^t \in \hat{P}^t}\left(\min_{p_j^t \in P^t} s_j^t \|\hat{p}_i^t - p_j^t\|\right) + \sum\nolimits_{p_j^t \in P^t}\left(\min_{\hat{p}_i^t \in \hat{P}^t} s_j^t \|p_j^t - \hat{p}_i^t\|\right)$$

Figures 5, 6:
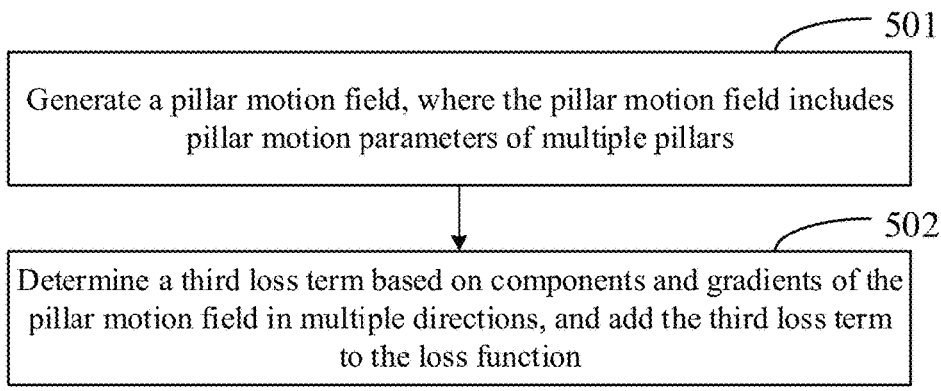
FIG. 5 shows a flow chart of determining a smoothness loss according to an embodiment of the present disclosure.
FIG. 6 shows a table comparing results of different models according to an embodiment of the present disclosure.

Based on the above embodiment, the method further includes applying a local smoothness loss to the pillar motion learning. As shown in FIG. 5, the process includes steps 501 to 502.

In step 501, a pillar motion field is generated including pillar motion parameters of multiple pillars.

In step 502, a third loss term is determined based on the components and gradients of the pillar motion field in multiple directions, and the third loss term is added into the loss function.

In the embodiment of the present disclosure, each frame includes multiple pillars, whose pillar motion parameters may indicate an overall motion condition, that is, a pillar motion field. The smoothness loss, that is, the third loss term, is determined based on the components and gradients of the pillar motion field in multiple directions, so that the model is enabled to predict similar motions of pillars belonging to a same object.

In an embodiment, the step of determining the third loss term based on the components and gradients of the pillar motion field in multiple directions described in step 502 includes: determining the components and gradients of the pillar motion field in the x direction and y direction in the horizontal plane, and determining the third loss term using the following equation:

$$\mathcal{L}_{smooth} = |\nabla_x \mathcal{M}_x^t| + |\nabla_y \mathcal{M}_x^t| + |\nabla_x \mathcal{M}_y^t| + |\nabla_y \mathcal{M}_y^t| \quad (7)$$

where $\mathcal{M}_x^t$ represents a component of a pillar motion field of a t-th frame in the x direction, $\mathcal{M}_y^t$ represents a component of the pillar motion field of the t-th frame in the y direction, $\nabla_x$ represents a gradient in the x direction, $\nabla_y$ represents a gradient in the x direction.

In addition, if the loss function includes multiple loss terms, that is, if other loss terms (such as the second loss term and the third loss term) are included in addition to the first loss term, then the loss function is determined using a weighting method. Specifically, when there are loss terms other than the first loss term, balance coefficients are set for the first loss term and the other loss terms, and thereby generates the loss function. For example, if the loss function is determined comprehensively based on the first loss term, the second loss term, and the third loss term, the loss function may be calculated using the following equation:

$$\mathcal{L}_{total} = \lambda_1 \mathcal{L}_{consist} + \lambda_2 \mathcal{L}_{regular} + \lambda_3 \mathcal{L}_{smooth} \quad (8)$$

where $\lambda_1$, $\lambda_2$ and $\lambda_3$ represent balance coefficients of respective loss terms.

A flow of the method is described in detail through an embodiment as follows. It should be noted that, in the description of the embodiment, i and j in the following equations or parameters each indicate an index, and may have different meanings (that is, indicate different indices) in different equations or parameters.

In the embodiment of the present disclosure, an egoistic vehicle is equipped with a LiDAR and multiple camera device, and a corresponding point cloud and image data are captured at each timestamp t. The timestamp t corresponds to the t-th frame, and the point cloud $P^t$ of the $t^{th}$ frame is expressed by $P^t=\{p_i^t\}_{i=1}^{N_1}$, and the image data $I^t$ of the t-th frame is expressed by $C^t=\{c_i^t\}_{i=1}^{N_2}$. In the expressions, $N_1$ represents the number of real points included in point cloud $P^t$, and point clouds of different frames may have different $N_1$; and $N_2$ represents the number of pixels included in the image data $I^t$. In addition, although multiple camera devices with different orientations may be provided on the egoistic vehicle, that is, the image data of the $t^{th}$ frame may include multiple images, only one of the images is taken as an example for illustration.

In the embodiment of the present disclosure, the point cloud $P^t$ may be discretized into multiple non-overlapping pillars $\{p_i^t\}_{i=1}^{N_3}$ (when dividing to obtain the pillars in practice, some of the pillars do not include any real point, while the embodiment of the present disclosure only focuses on non-empty pillars which include real points). Each of the pillars is provided with a corresponding pillar motion parameter $M_i^t$. Multiple pillar motion parameters $M_i^t$ may form a pillar motion field $\mathcal{M}^t$. For example, $\mathcal{M}^t=\{M_i^t\}_{i=1}^{N_3}$.

For the point cloud of the $t^{th}$ frame, with the action of the pillar motion parameter $M_i^t$, the pillar $p_i^t$ of the $t^{th}$ frame may be moved to a corresponding position in the $t+1^{th}$ frame, forming a predicted pillar $\tilde{p}_i^{t+1}$ in the $t+1^{th}$ frame, which may be expressed by $\tilde{p}_i^{t+1}=M_i^t(p_i^t)$. Correspondingly, the $i^{th}$ real point $p_i^t$ in the $t^{th}$ frame may be moved to a corresponding position to form a predicted point $\tilde{p}_i^{t+1}$ of the $t+1^{th}$ frame, that is, $\tilde{p}_i^{t+1}=M_i^t(p_i^t)$. All predicted points $\tilde{p}_i^{t+1}$ may further form a predicted point cloud $\tilde{p}^{t+1}$, and $\tilde{p}^{t+1}=\{\tilde{p}_i^{t+1}\}_{i=1}^{N_1}$. In addition, the point cloud of the $t+1^{th}$ frame includes the real point $\tilde{p}_i^{t+1}$, then the structural consistency loss, that is, the first loss term may be determined based on the predicted point $\tilde{p}_i^{t+1}$ and the real point $p_i^{t+1}$. The first loss term may indicate the difference between the predicted point cloud $\tilde{p}^{t+1}$ and the real point cloud $p^{t+1}$. The above equation (1) indicates the calculation of the first loss term of the $t^{th}$ frame, which may similarly be used to calculate the first loss term of the $t+1^{th}$ frame.

In the embodiment of the present disclosure, since the LiDAR and the camera device are paired and the image data collected by the image device has denser information, the real point $p_i^t$ of the $t^{th}$ frame point cloud may correspond to respective pixel point in the image data $I^t$ of the $t^{th}$ frame, that is, the first pixel point $(u_i, v_i)^t$. Furthermore, a corresponding overall optical flow $F(u, v)^t$ may be estimated based on the image data $I^t$ and $I^{t+1}$ of the two frames, thereby determining an overall optical flow $F(u_i, v_i)^t$ of the first pixel point. When an egoistic optical flow $F_{ego}(u_i, v_i)^t$ is determined using the above equation (3), an object optical flow $F_{obj}(u_i, v_i)^t$ may be determined.

Moreover, the pillar motion parameter $M_i^t$ of the first pixel point may be projected onto the image plane to determine a projected optical flow $\tilde{F}(u_i, v_i)^t$. The regularization loss of a cross-sensor motion, that is, the second loss term, may be determined using equation (5).

In addition, when the object optical flow $F_{obj}(u_i, v_i)^t$ is determined, a probability $s_i^t$ that the real point corresponds to a dynamic object is calculated, thereby introducing a probabilistic motion mask into the first loss term so as to optimize the structural consistency loss. In addition, the pillar motion field $\mathcal{M}^t$ may be divided into a component $\mathcal{M}_x^t$ in the x direction and a component $\mathcal{M}_y^t$ in the y direction. Therefore, a smoothness loss, that is, a third loss term, is determined based on the equation (7). Finally, a loss function is determined by weighting, details of which may be seen in equation (8). When the loss function is determined, a self-supervised learning may be performed.

The self-supervised learning framework provided in the embodiment of the present disclosure does not depend on a specific backbone network, and can be widely applied. In addition, in the embodiment of the present disclosure, models having different combinations are compared. Non-empty pillars are divided into three groups by velocity, namely static, slow (≤5 m/s) and fast (>5 m/s). Estimations are made on all non-empty pillars, all foreground object pillars, and all moving object pillars. Reference may be made to the table shown in FIG. 6 for average errors and median errors of different models, in which the bolded numbers indicate the minimum values.

In FIG. 6, a basic model (a) that is trained with respect to only the structural consistency loss $\mathcal{L}_{consist}$ does not work well for the static group, which is in line with the previous description stating that a static pillar introduces noise. In model (b), by using the cross-sensor motion regularization $\mathcal{L}_{regular}$ as the only supervision, an egoistic motion of a static point may be reliably recovered from the optical flow. Therefore, model (b) achieves a better result for the static group, but the result for the fast group is much worse. This is because that it is indefinite to regularize the motion only in an image plane of a 2D camera, and multiple real points in a 3D point cloud may have different pillar motion parameters but are projected as a same pixel point in the 2D image plane.

The model (c) that combines the structural consistency loss and a motion regularization loss performs well in the fast group, but it is still not the best choice for the static group and the slow group. This is mainly due to the inconsistency between the two losses in the static region and the slow motion region. The probabilistic motion mask is integrated into model (c) using the probability $s_i^t$ Model (e) realizes an improvement for the static group and the slow group. This is because the model can less confuse the noisy motion caused by a moving egoistic vehicle by suppressing the static pillar, so as to better focus on the learning of real object motion. Model (d) uses only the probabilistic motion mask to enhance the structural consistency loss. Compared with model (a), Model (d) achieves significant improvement for the static group and the slow group; however, model (d) is still inferior to model (e), which also verifies the effectiveness of cross-sensor motion regularization that provides complementary motion supervision.

The comparison result of the model trained based on the embodiment of the present disclosure and other models may be seen in Table 1 below.

TABLE 1

| Method | Static | | Velocity ≤ 5 m/s | | Velocity > 5 m/s | | time |
| --- | --- | --- | --- | --- | --- | --- | --- |
| | Average | Median | Average | Median | Average | Median | |
| FlowNet3D (pre-trained) | 2.0514 | 0.0000 | 2.2058 | 0.3172 | 9.1923 | 8.4923 | 0.434 s |
| HPLFlowNet (pre-trained) | 2.2165 | 1.4925 | 1.5477 | 1.1269 | 5.9841 | 4.8553 | 0.352 s |
| In the present embodiment | 0.1620 | 0.0010 | 0.6972 | 0.1758 | 3.5504 | 2.0844 | 0.020 s |
| FlowNet3D | 0.0410 | 0.0000 | 0.8183 | 0.1782 | 8.5261 | 8.0230 | 0.434 s |
| HPLFlowNet | 0.0041 | 0.0002 | 0.4458 | 0.0969 | 4.3206 | 2.4881 | 0.352 s |
| PointRCNN | 0.0204 | 0.0000 | 0.5514 | 0.1627 | 3.9888 | 1.6252 | 0.201 s |
| LSTMEncoderDecoder | 0.0358 | 0.0000 | 0.3551 | 0.1044 | 1.5885 | 1.0003 | 0.042 s |
| MotionNet | 0.0239 | 0.0000 | 0.2467 | 0.0961 | 1.0109 | 0.6994 | 0.019 s |
| MotionNet (pillar-based) | 0.0258 | — | 0.2612 | — | 1.0747 | — | 0.019 s |
| MotionNet + MGDA | 0.0201 | 0.0000 | 0.2292 | 0.0952 | 0.9454 | 0.6180 | 0.019 s |
| In the present embodiment (slightly adjusted) | 0.0245 | 0.0000 | 0.2286 | 0.0930 | 0.7784 | 0.4685 | 0.020 s |

Table 1 is divided into an upper part and a lower part. In the upper part of Table 1, the self-supervised model provided in the embodiment of the present disclosure is compared with the models of application scene flow, including FlowNet3D and HPLFlowNet.

The self-supervised model provided in the present embodiment is significantly superior to the pre-trained models, even though they are supervised. Moreover, the self-supervised model is superior or approximate to some methods that are trained with full supervision on a benchmark dataset. For example, for the fast group, the model in the present embodiment performs better than FlowNet3D, HPLFlowNet and PointRCNN. All these comparisons clearly show the advantages of the method for self-supervised learning provided in the embodiments of the present disclosure and the importance of self-supervised training on a target domain. In addition, compared with other existing models, the model provided in the present embodiment has higher computational efficiency (about 0.02 s), so that it is able to process large-scale point clouds in real time.

The above description has illustrated the method for self-supervised learning provided in the embodiments of the present disclosure. The method may be implemented by a corresponding device. Accordingly, the device for self-supervised learning provided by the embodiments of the present disclosure is described in detail as follows.

Figure 7:
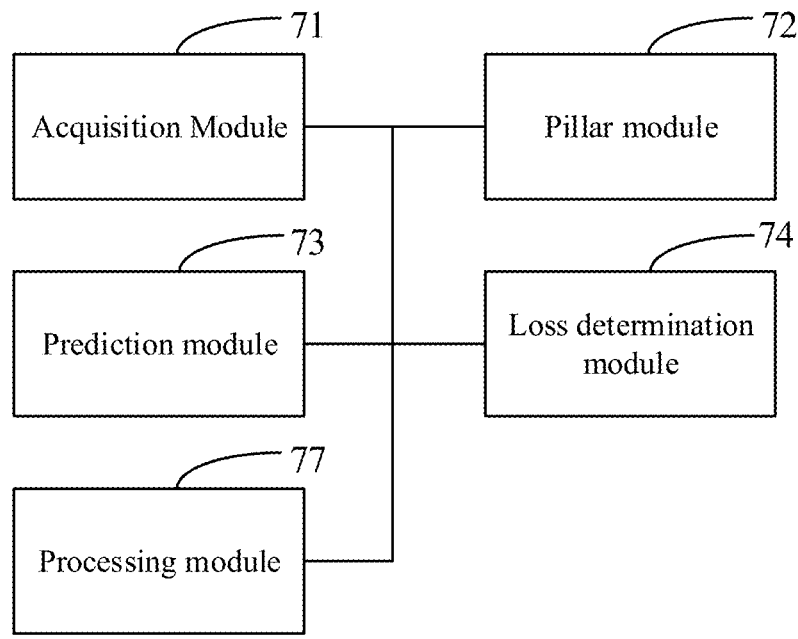
FIG. 7 shows a schematic structural diagram of a device for self-supervised learning according to an embodiment of the present disclosure.

FIG. 7 shows a schematic structural diagram of a device for self-supervised learning according to an embodiment of the present disclosure. As shown in FIG. 7, the device for self-supervised learning includes an acquisition module 71, a pillar module 72, a prediction module 73, a loss determination module 74 and a processing module 75.

The acquisition module 71 is configured to acquire an unlabeled dataset, where the dataset includes point clouds in multiple frames, and a point cloud in each of the multiple of frames includes multiple real points.

The pillar module 72 is configured to organize real points in one column along a vertical direction into a pillar, wherein the pillar is provided with a pillar motion parameter, and each of the real points in the pillar has a motion parameter that is the same as the pillar motion parameter.

The prediction module 73 is configured to, for each of real points in a current frame, move the real point to a next frame based on a corresponding pillar motion parameter, to determine a predicted point in the next frame.

The loss determination module 74 is configured to determine a first loss term based on a minimum distance among distances between predicted points in the next frame and real points in the next frame, and generate a loss function including the first loss term.

The processing module 75 is configured to perform self-supervised learning processing based on the loss function to determine a pillar motion parameter of the pillar.

Based on the above embodiment, the loss determination module 74 includes a first loss term determination unit. The first loss term determination unit is configured to: determine the first loss term based on a first minimum distance and/or a second minimum distance. The first minimum distance is a minimum distance among distances from a predicted point in the next frame to multiple real points in the next frame. The second minimum distance is a minimum distance among distances from a real point in the next frame to multiple predicted points in the next frame.

Based on the above embodiment, the first loss term determination unit being configured to determine a first loss term based on a first minimum distance and/or a second minimum distance includes the first loss term determination unit being configured to: add a sum of first minimum distances corresponding to multiple predicted points in the next frame to a sum of second minimum distances corresponding to multiple real points in the next frame to obtain the first loss term according to the following equation:

$$\mathcal{L}_{consist} = \sum\nolimits_{\tilde{p}_i^t \in \tilde{p}^t} \left( \min_{p_j^t \in p^t} \|\tilde{p}_i^t - p_j^t\| \right) + \sum\nolimits_{p_j^t \in p^t} \left( \min_{\tilde{p}_i^t \in \tilde{p}^t} \|p_j^t - \tilde{p}_i^t\| \right)$$

where $\mathcal{L}_{consist}$ represents the first loss term, $\tilde{p}_i^t$ represents an i-th predicted point in a t-th frame, $\tilde{p}^t$ represents a set of multiple predicted points in the t-th frame, $p_j^t$ represents a j-th real point in the t-th frame, and $p^t$ represents a set of multiple real points in the t-th frame.

Based on the above embodiments, the dataset further includes image data of multiple frames matching the point clouds in the multiple frames. The loss determination module 74 includes a second loss term determination unit. The second loss term determination unit is configured to: project a real point in a target frame onto an image plane including image data to determine a first pixel, and determine an ego-optical flow of the first pixel based on a pose change of an ego-vehicle, where the target frame is the current frame or the next frame, and the first pixel is a pixel in the image data of the target frame and matching a real point in the target frame; determine an overall optical flow of the first pixel based on the image data, and determine an object optical flow of the first pixel based on the overall optical flow and the ego-optical flow; project a pillar motion parameter corresponding to the real point in the target frame onto the image plane, and determine a corresponding projected optical flow; and determine a second loss term based on a difference between the object optical flow and the projected optical flow, and add the second loss term to the loss function.

Based on the above embodiments, the second loss term determination unit being configured to determine a second loss term based on a difference between the object optical flow and the projected optical flow includes determining the second loss term according to the following equation:

$$\mathcal{L}_{regular} = \Sigma \|\tilde{F}(u_i, v_i)^t - F_{obj}(u_i, v_i)^t\|$$

where $\mathcal{L}_{regular}$ represents the second loss term, $(u_i, v_i)^t$ represents a first pixel in a t-th frame corresponding to an i-th real point $p_i^t$, $\tilde{F}(u_i, v_i)^t$ represents a projected optical flow of the first pixel $(u_i, v_i)^t$, and $F_{obj}(u_i, v_i)^t$ represents an object optical flow of the first pixel $(u_i, v_i)^t$.

Based on the above embodiments, the dataset further includes image data of the multiple frames matching the point clouds in the multiple frames. The loss determination module 74 includes a dynamic probability determination unit. The dynamic probability determination unit is configured to: project a real point in a target frame onto an image plane including image data to determine a first pixel, and determine an ego-optical flow of the first pixel based on a pose change of an ego-vehicle, where the target frame is the current frame or the next frame, and the first pixel is a pixel in the image data of the target frame and matching a real point in the target frame; determine an overall optical flow of the first pixel based on the image data, and determine an object optical flow of the first pixel based on the overall optical flow and the ego-optical flow; and determine a probability that the first pixel corresponds to a dynamic object based on a magnitude of the object optical flow, to determine a probability that a real point in the target frame corresponding to the first pixel corresponding to the dynamic object; where the probability is positively correlated with the magnitude of the object optical flow. The loss determination module 74 determining the first loss term based on minimum distances among distances between predicted points in the next frame and real points in the next frame includes the loss determination module 74 is configured to: weight, with the probability that the real point corresponds to the dynamic object as a weighting coefficient, minimum distances between predicted points in the next frame and real points in the next frame, and determine the first loss term based on a minimum distance obtained from weighting.

Based on the above embodiments, the dynamic probability determination unit being configured to determine a probability that the first pixel corresponds to a dynamic object based on magnitude of the object optical flow includes: determining the probability that the first pixel corresponds to the dynamic object according to the following equation:

$$s_i^t = 1 - \exp\{-\alpha \max(\|F_{obj}(u_i, v_i)^t\| - \tau, 0)\}$$

where $(u_i, v_i)^t$ represents a first pixel in a t-th frame corresponding to an i-th real point, $F_{obj}(u_i, v_i)^t$ represents an object optical flow of the first pixel $(u_i, v_i)^t$, $s_i^t$ represents a probability that the first pixel $(u_i, v_i)^t$ corresponds to a dynamic object, $\alpha$ is a smoothing factor, and $\tau$ is a tolerance.

Based on the above embodiments, the second loss term determination unit or the dynamic probability determination unit being configured to project a real point in a target frame onto an image plane including image data to determine a first pixel, and determine an ego-optical flow of the first pixel based on a pose change of an ego-vehicle, includes the second loss term determination unit or the dynamic probability determination unit being configured to: determine a relative pose $T_{L \to C}$ between LIDAR for collecting the point cloud and a camera for collecting the image data, and determine an inherent parameter K of the camera; project the real point in the target frame onto the image plane including the image data based on the relative pose and the inherent parameter, to determine the first pixel; determine the pose change $T_{t \to t+1}$ of the ego-vehicle in the target frame, and determine the ego-optical flow of the first pixel according to the following equation:

$$F_{ego}(u_i, v_i)^t = KT_{L \to C} T_{t \to t+1} p_i^t - (u_i, v_i)^t$$

where $p_i^t$ represents an i-th real point in the t-th frame, $(u_i, v_i)^t$ represents a first pixel in the t-th frame corresponding to the i-th real point, and $F_{ego}(u_i, v_i)^t$ represents an ego-optical flow of the first pixel $(u_i, v_i)^t$.

Based on the above embodiments, a component of the pillar motion parameter in the vertical direction is zero.

Based on the above embodiments, the loss determination module 74 includes a third loss term determination unit. The third loss term determination unit is configured to: generate a pillar motion field, where the pillar motion field includes pillar motion parameters of multiple pillars; and determine a third loss term based on components and gradients of the pillar motion field in multiple directions, and add the third loss term to the loss function.

Based on the above embodiments, the third loss term determination unit being configured to determine the third loss term based on components and gradients of the pillar motion field in multiple directions includes the third loss term determination unit being configured to: determine components and gradients of the pillar motion field in an x direction and a y direction in a horizontal plane, and determine the third loss term according to the following equation:

$$\mathcal{L}_{smooth} = |\nabla_x \mathcal{M}_x^t| + |\nabla_y \mathcal{M}_x^t| + |\nabla_x \mathcal{M}_y^t| + |\nabla_y \mathcal{M}_y^t|$$

where $\mathcal{M}_x^t$ represents a component of a pillar motion field of a t-th frame in the x direction, $\mathcal{M}_y^t$ represents a component of the pillar motion field of the t-th frame in the y direction, $\nabla_x$ represents a gradient in the x direction, $\nabla_y$ represents a gradient in the x direction.

Based on the above embodiments, the loss determination module 74 being configured to generate the loss function including the first loss term includes the loss determination module 74 being configured to: set, in a case of other loss term than the first loss item, a balance coefficient for the first loss term and the other loss term, and generate the loss function.

In addition, an electronic device is further provided according to an embodiment of the present disclosure. The electronic device includes a bus, a transceiver, a memory, a processor, and a computer program stored in the memory and executable by the processor. The transceiver, the memory and the processor are connected to each other via the bus. The computer program is used to, when being executed by the processor, implement the method for self-supervised learning according to the above various embodiments. The electronic device can achieve the same technical effect, which is not repeated herein.

Figure 8:
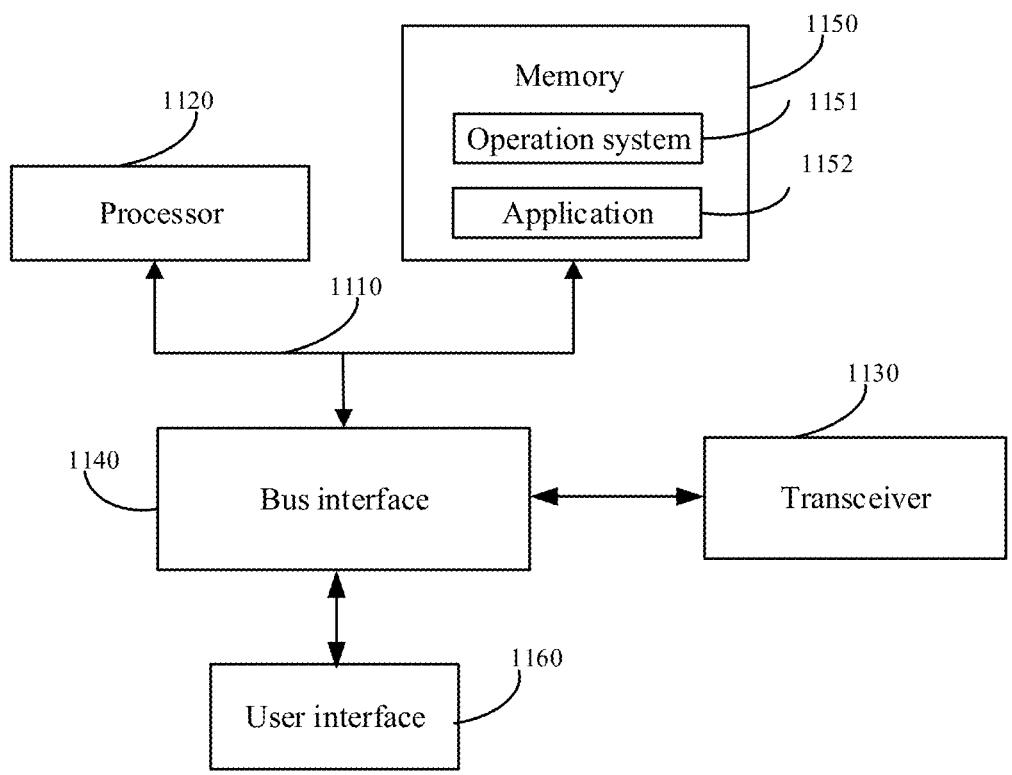
FIG. 8 shows a schematic structural diagram of a device for self-supervised learning according to an embodiment of the present disclosure.

Specifically, referring to FIG. 8, an electronic device is further provided according to an embodiment of the present disclosure. The electronic device includes a bus 1110, a processor 1120, a transceiver 1130, a bus interface 1140, a memory 1150, and a user interface 1160.

In the embodiments of the present disclosure, the electronic device further includes: a computer program stored in the memory 1150 and can be run on the processor 1120. The computer program is executed by the processor 1120 to implement the method for self-supervised learning according to the above various embodiments.

The transceiver 1130 is configured to receive and send data under the control of the processor 1120.

In an embodiment of the present disclosure, a bus architecture (represented by bus 1110). The bus 1110 may include any number of interconnected buses and bridges. The bus 1110 connects various circuits of one or more processors represented by processor 1120 and memory represented by memory 1150.

The bus 1110 represents one or more of any one of several types of bus structures, including a memory bus and a memory controller, a peripheral bus, an Accelerate Graphical Port (AGP), a processor, or a local bus of any bus structure in various bus architectures. By way of example and not limitation, such architectures include: Industry Standard Architecture (ISA) bus, Micro Channel Architecture (MCA) bus, Extended ISA (Enhanced ISA, EISA) bus, Video Electronics Standard Association (VESA) bus, and Peripheral Component Interconnect (PCI) bus.

The processor 1120 may be an integrated circuit chip with signal processing capabilities. In the implementation process, the steps of the foregoing method embodiments may be implemented by an integrated logic circuit in the form of hardware in the processor or instructions in the form of software. The above processor includes: a general-purpose processor, a Central Processing Unit (CPU), a Network Processor (NP), a Digital Signal Processor (DSP), an Application Specific Integrated Circuit (ASIC), a Field Programmable Gate Array (FPGA), a Complex Programmable Logic Device (CPLD), a Programmable Logic Array (PLA), a Microcontroller Unit (MCU), or other programmable logic devices, discrete gates, transistor logic devices, discrete hardware components, which can implement or execute the methods, steps, and logical block diagrams disclosed in the embodiments of the present disclosure. For example, the processor may be a single-core processor or a multi-core processor, and the processor may be integrated into a single chip or located on multiple different chips.

The processor 1120 may be a microprocessor or any conventional processor. The method steps disclosed in conjunction with the embodiments of the present disclosure may be directly performed by a hardware decoding processor, or may be performed by a combination of hardware in the decoding processor and software modules. The software modules may be located in a Random Access Memory (RAM), a Flash Memory (Flash Memory), a Read-Only Memory (ROM), a Programmable Read Only Memory (Programmable ROM, PROM), an erasable and removable Programming read-only memory (Erasable PROM, EPROM), registers and other readable storage mediums known in the art. The readable storage medium is located in the memory, and the processor reads the information in the memory and implements the steps of the above method in combination with its hardware.

The bus 1110 may also connect various other circuits such as peripheral devices, voltage regulators, or power management circuits with each other. The bus interface 1140 provides an interface between the bus 1110 and the transceiver 1130, which are well known in the art. Therefore, it will not be further described in the embodiments of the present disclosure.

The transceiver 1130 may be one element or multiple elements, such as multiple receivers and transmitters, providing a unit for communicating with various other devices via a transmission medium. For example, the transceiver 1130 receives external data from other devices, and the transceiver 1130 is configured to send the data processed by the processor 1120 to other devices. Depending on the nature of the computer system, a user interface 1160 may also be provided, which includes, for example: a touch screen, a physical keyboard, a display, a mouse, a speaker, a microphone, a trackball, a joystick, and a stylus.

It should be understood that, in the embodiments of the present disclosure, the memory 1150 may further include memories set remotely with respect to the processor 1120, and these remotely set memories may be connected to the server through a network. One or more parts of the above network may be an ad hoc network, an intranet, an extranet, a Virtual Private Network (VPN), a Local Area Network (LAN), a Wireless Local Area Network (WLAN), a Wide Area Network (WAN), a Wireless Wide Area Network (WWAN), a Metropolitan Area Network (MAN), the Internet, a Public Switched Telephone Network (PSTN), a Plain Old Telephone Service Network (POTS), a Cellular Telephone Network, a wireless network, a Wireless Fidelity (Wi-Fi) network and a combination of two or more of the above networks. For example, the cellular telephone network and the wireless network may be a Global Mobile Communication (GSM) system, a Code Division Multiple Access (CDMA) system, a Global Microwave Interconnected Access (WiMAX) system, a General Packet Radio Service (GPRS) system, and a Wideband Code Division Multiple Address (WCDMA) system, a Long Term Evolution (LTE) system, an LTE Frequency Division Duplex (FDD) system, an LTE Time Division Duplex (TDD) system, an advanced long term evolution (LTE-A) system, an Universal Mobile Telecommunications (UMTS) system, an Enhanced Mobile Broadband (eMBB) system, a mass Machine Type of Communication (mMTC) system, an ultra-Reliable Low-Latency Communications (uRLLC) system, and the like.

It should be understood that the memory 1150 in the embodiments of the present disclosure may be a volatile memory or a non-volatile memory, or may include both a volatile memory and a non-volatile memory. The non-volatile memory includes: a Read-Only Memory (ROM), a Programmable Read-Only Memory (Programmable ROM, PROM), an Erasable Programmable Read-Only Memory (Erasable PROM, EPROM), an Electronically Erasable Programmable Read Only Memory (Electrically EPROM, EEPROM) or a Flash Memory (Flash Memory).

The volatile memory includes: a Random Access Memory (RAM), which is used as an external cache. By way of example but not limitation, many forms of RAM may be used, such as: a Static Random Access Memory (Static RAM, SRAM), a Dynamic Random Access Memory (Dynamic RAM, DRAM), a Synchronous Dynamic Random Access Memory (Synchronous DRAM, SDRAM), a Double Data Rate Synchronous Dynamic Random Access Memory (Double Data Rate SDRAM, DDRSDRAM), an Enhanced Synchronous Dynamic Random Access Memory (Enhanced SDRAM, ESDRAM), a Synchronous Linked Dynamic Random Access Memory (Synchlink DRAM, SLDRAM), and a direct memory bus random access memory (Direct Rambus RAM, DRRAM). The memory 1150 of the electronic device described in the embodiments of the present disclosure includes but is not limited to the above and any other suitable types of memories.

In the embodiments of the present disclosure, the memory 1150 stores the following elements of the operating system 1151 and the application program 1152: executable modules, data structures, a subset of the executable modules and the structures, or an extended set of the executable modules and the structures.

Specifically, the operating system 1151 includes various system programs, such as a framework layer, a core library layer, a driver layer, and the like, for implementing various basic services and processing hardware-based tasks. The application 1152 includes various applications, such as a Media Player and a Browser, which are used to implement various application services. The program for implementing the method of the embodiment of the present disclosure may be included in the application 1152. The application 1152 include: applets, objects, components, logic, data structures, and other computer system executable instructions that perform specific tasks or implement specific abstract data types.

In addition, according to an embodiment of the present disclosure, a computer-readable storage medium is provided, which stores a computer program. The computer program is used to, when being executed by a processor, implement the method for self-supervised learning according to the above various embodiments. The computer-readable storage medium can achieve the same technical effect, which is not repeated herein.

The computer-readable storage medium includes: permanent or non-permanent mediums, and removable or non-removable mediums, and is a tangible device that is capable of retaining and storing instructions for use by an instruction execution device. The computer-readable storage medium includes: an electronic storage device, a magnetic storage device, an optical storage device, an electromagnetic storage device, a semiconductor storage device, and any suitable combination thereof. The computer readable storage medium includes: a Phase Change Memory (PRAM), a Static Random Access Memory (SRAM), a Dynamic Random Access Memory (DRAM), other types of Random Access Memories (RAM), a Read Only Memory (ROM), a Non-Volatile Random Access Memory (NVRAM), an Electrically Erasable Programmable Read-Only Memory (EEPROM), a flash memory or another memory technology, a Compact Disc Read-Only Memory (CD-ROM), a Digital Versatile Disc (DVD) or another optical storage, a magnetic cassette storage, a magnetic tape storage or another magnetic storage device, a memory stick, a mechanical coding device (such as a punched card or raised structures in grooves on which instructions are recorded) or any other non-transmission medium that can be used to store information that may be accessed by computing devices. According to the definition in the embodiments of the present disclosure, the computer-readable storage medium does not include the transitory signal itself, such as radio waves or other freely propagating electromagnetic waves, electromagnetic waves propagating through waveguides or other transmission media (such as optical pulses passing through fiber optic cables), or electrical signals transmitted through wires.

In the embodiments according to the present disclosure, it should be understood that the disclosed apparatus, electronic device and method may be implemented in other ways. For example, the apparatus embodiments described above are only schematic. For example, the units or modules are divided based on a logic function thereof, and they may be divided in another way in practice. For example, multiple units or modules may be combined or integrated into another system, or some features may be omitted or not performed. In addition, a coupling, a direct coupling or communication connection between displayed or discussed constitutional components may be an indirect coupling or communication connection via some interfaces, devices or modules, and may be in an electrical form, a mechanical form or another form.

The integrated unit may be stored in a computer readable storage medium if the integrated unit is implemented as a software function unit and sold or used as a separate product. Base on such understanding, the essential part of the technical solution of the present disclosure or the part of the technical solution of the present disclosure contributed to the conventional technology or all of or a part of the technical solution may be embodied in a software product. The computer software product is stored in a storage medium, which includes several instructions to make a computer device (may be a personal computer, a server, a network device or the like) execute all or a part of steps of the method according to each embodiment of the present disclosure. The storage medium described above includes various mediums listed above which can store program codes.

In the description of the embodiments of the present disclosure, those skilled in the art should understand that the embodiments of the present disclosure may be implemented as a method, an apparatus, an electronic device, and a computer-readable storage medium. Therefore, the embodiments of the present disclosure may be embodied in the following forms: complete hardware, complete software (including firmware, resident software, microcode, etc.), a combination of hardware and software. In addition, in some embodiments, the embodiments of the present disclosure may also be implemented in the form of a computer program product in one or more computer-readable storage mediums, where the computer-readable storage mediums include computer program codes.

In the embodiments of the present disclosure, the provided method, apparatus, and electronic device are described by using flowcharts and/or block diagrams.

It should be understood that each block of the flowcharts and/or block diagrams, and combinations of blocks in the flowcharts and/or block diagrams, may be implemented by computer-readable program instructions. These computer-readable program instructions may be provided to a processor of a general-purpose computer, a special-purpose computer, or another programmable data processing device, thereby producing a machine. These computer-readable program instructions are executed by a computer or another programmable data processing device to produce an apparatus for implementing the functions/operations specified by the blocks in the flowcharts and/or block diagrams.

These computer-readable program instructions may also be stored in a computer-readable storage medium that enables a computer or another programmable data processing device to work in a specific manner. In this way, the instructions stored in the computer-readable storage medium produce an instruction device product that implements the functions/operations specified in the blocks of the flowcharts and/or block diagrams.

Computer-readable program instructions may also be loaded onto a computer, another programmable data processing device, or another device, such that a series of operating steps can be performed on a computer, another programmable data processing device, or another device to produce a computer-implemented process. Thus, the instructions executed on a computer or another programmable data processing device can provide a process for implementing the functions/operations specified by the blocks in the flowcharts and/or block diagrams.

Specific embodiments of the present disclosure are disclosed as described above, but the scope of protection of the present disclosure is not limited thereto. Changes and alteration which may be obtained in the technical scope of the present disclosure by those skilled in the art should fall within the scope of protection of the present disclosure. Therefore, the scope of protection of the present disclosure should be defined by the appended claims.

The invention claimed is:

1. A method for self-supervised learning, comprising:
acquiring an unlabeled dataset, wherein the dataset comprises point clouds in a plurality of frames, and a point cloud in each of the plurality of frames comprises a plurality of real points;
organizing real points in one column along a vertical direction into a pillar, wherein the pillar is provided with a pillar motion parameter, and each of the real points in the pillar has a motion parameter that is the same as the pillar motion parameter;
for each of real points in a current frame, moving the real point to a next frame based on a corresponding pillar motion parameter, and determining a predicted point in the next frame;
determining a first loss term based on a minimum distance among distances between predicted points in the next frame and real points in the next frame, and generating a loss function comprising the first loss term; and
performing self-supervised learning processing based on the loss function to determine a pillar motion parameter of the pillar.

2. The method according to claim 1, wherein the determining a first loss term based on a minimum distance among distances between predicted points in the next frame and real points in the next frame comprises:
determining the first loss term based on a first minimum distance and/or a second minimum distance, wherein the first minimum distance is a minimum distance among distances from a predicted point in the next frame to a plurality of real points in the next frame, and the second minimum distance is a minimum distance among distances from a real point in the next frame to a plurality of predicted points in the next frame.

3. The method according to claim 2, wherein the determining the first loss term based on a first minimum distance and/or a second minimum distance comprises: adding a sum of first minimum distances corresponding to the plurality of predicted points in the next frame to a sum of second minimum distances corresponding to the plurality of real points in the next frame to obtain the first loss term according to the following equation:

$$\mathcal{L}_{consist} = \sum_{\tilde{p}_i^t \in \tilde{P}^t} \left( \min_{p_j^t \in P^t} \|\tilde{p}_i^t - p_j^t\| \right) + \sum_{p_j^t \in P^t} \left( \min_{\tilde{p}_i^t \in \tilde{P}^t} \|p_j^t - \tilde{p}_i^t\| \right)$$

wherein $\mathcal{L}_{consist}$ represents the first loss term, $\tilde{p}_i^t$ represents an i-th predicted point in a t-th frame, $\tilde{p}^t$ represents a set of a plurality of predicted points in the t-th frame, $p_j^t$ represents a j-th real point in the t-th frame, and $p^t$ represents a set of a plurality of real points in the t-th frame.

4. The method according to claim 1, wherein the dataset further comprises image data of the plurality of frames matching the point clouds in the plurality of frames, wherein the method further comprises:
projecting a real point in a target frame onto an image plane comprising image data to determine a first pixel, and determining an ego-optical flow of the first pixel based on a pose change of an ego-vehicle, wherein the target frame is the current frame or the next frame, and the first pixel is a pixel in the image data of the target frame and matching a real point in the target frame;
determining an overall optical flow of the first pixel based on the image data, and determining an object optical flow of the first pixel based on the overall optical flow and the ego-optical flow;
projecting a pillar motion parameter corresponding to the real point in the target frame onto the image plane, and determining a corresponding projected optical flow; and
determining a second loss term based on a difference between the object optical flow and the projected optical flow, and adding the second loss term to the loss function.

5. The method according to claim 4, wherein the determining a second loss term based on a difference between the object optical flow and the projected optical flow comprises: determining the second loss term according to the following equation:

$$\mathcal{L}_{regular} = \Sigma \|\tilde{F}(u_i, v_i)^t - F_{obj}(u_i, v_i)^t\|$$

wherein $\mathcal{L}_{regular}$ represents the second loss term, $(u_i, v_i)^t$ represents a first pixel in a t-th frame corresponding to an i-th real point $p_i^t$, $\tilde{F}(u_i, v_i)^t$ represents a projected optical flow of the first pixel $(u_i, v_i)^t$, and $F_{obj}(u_i, v_i)^t$ represents an object optical flow of the first pixel $(u_i, v_i)^t$.

6. The method according to claim 4, wherein the projecting a real point in a target frame onto an image plane comprising image data to determine a first pixel, and determining an ego-optical flow of the first pixel based on a pose change of an ego-vehicle comprises:
determining a relative pose $T_{L \to C}$ between LiDAR for collecting the point cloud and a camera for collecting the image data, and determining an inherent parameter K of the camera;
projecting the real point in the target frame onto the image plane comprising the image data based on the relative pose and the inherent parameter, to determine the first pixel;
determining the pose change $T_{t \to t+1}$ of the ego-vehicle in the target frame, and determining the ego-optical flow of the first pixel according to the following equation:

$$F_{ego}(u_i, v_i)^t = KT_{L \to C} T_{t \to t+1} p_i^t - (u_i, v_i)^t$$

wherein $p_i^t$ represents an i-th real point in the t-th frame, $(u_i, v_i)^t$ represents a first pixel in the t-th frame corresponding to the i-th real point, and $F_{ego}(u_i, v_i)^t$ represents an ego-optical flow of the first pixel $(u_i, v_i)^t$.

7. The method according to claim 1, wherein the dataset further comprises image data of the plurality of frames matching the point clouds in the plurality of frames, wherein the method further comprises:
projecting a real point in a target frame onto an image plane comprising image data to determine a first pixel, and determining an ego-optical flow of the first pixel based on a pose change of an ego-vehicle, wherein the target frame is the current frame or the next frame, and the first pixel is a pixel in the image data of the target frame and matching a real point in the target frame;
determining an overall optical flow of the first pixel based on the image data, and determining an object optical flow of the first pixel based on the overall optical flow and the ego-optical flow; and
determining a probability that the first pixel corresponds to a dynamic object based on magnitude of the object optical flow, to determine a probability that a real point in the target frame corresponding to the first pixel corresponds to the dynamic object, wherein the probability is positively correlated to the magnitude of the object optical flow;

and wherein the determining a first loss term based on minimum distances among distances between predicted points in the next frame and real points in the next frame comprises:

weighting, with the probability that the real point corresponds to the dynamic object as a weighting coefficient, minimum distances between predicted points in the next frame and real points in the next frame, and determining the first loss term based on a minimum distance obtained from weighting.

8. The method according to claim 7, wherein the determining a probability that the first pixel corresponds to a dynamic object based on magnitude of the object optical flow comprises: determining the probability that the first pixel corresponds to the dynamic object according to the following equation:

$$s_i^t = 1 - \exp\{-\alpha \max(\|F_{obj}(u_i, v_i)^t\| - \tau, 0)\}$$

wherein $(u_i, v_i)^t$ represents a first pixel in a t-th frame corresponding to an i-th real point, $F_{obj}(u_i, v_i)^t$ represents an object optical flow of the first pixel $(u_i, v_i)^t s_i^t$ represents a probability that the first pixel $(u_i, v_i)^t$ corresponds to a dynamic object, $\alpha$ is a smoothing factor, and $\tau$ is a tolerance.

9. The method according to claim 1, wherein a component of the pillar motion parameter in the vertical direction is zero.

10. The method according to claim 1, further comprising:
generating a pillar motion field, wherein the pillar motion field comprises pillar motion parameters of a plurality of pillars; and
determining a third loss term based on components and gradients of the pillar motion field in a plurality of directions, and adding the third loss term to the loss function.

11. The method according to claim 10, wherein the determining a third loss term based on components and gradients of the pillar motion field in a plurality of directions comprises:
determining components and gradients of the pillar motion field in an x direction and a y direction in a horizontal plane, and determining the third loss term according to the following equation:

$$\mathcal{L}_{smooth} = |\nabla_x \mathcal{M}_x^t| + |\nabla_y \mathcal{M}_x^t| + |\nabla_x \mathcal{M}_y^t| + |\nabla_y \mathcal{M}_y^t|$$

wherein $\mathcal{M}_x^t$ represents a component of a pillar motion field of a t-th frame in the x direction, $\mathcal{M}_y^t$ represents a component of the pillar motion field of the t-th frame in the y direction, $\nabla_x$ represents a gradient in the x direction, $\nabla_y$ represents a gradient in the x direction.

12. The method according to claim 1, wherein the generating a loss function comprising the first loss term comprises:
in a case of other loss term than the first loss term, setting a balance coefficient for the first loss term and the other loss term, and generating the loss function.

13. A device for self-supervised learning, comprising:
an acquisition module configured to acquire an unlabeled dataset, wherein the dataset comprises point clouds in a plurality of frames, and a point cloud in each of the plurality of frames comprises a plurality of real points;
a pillar module configured to organize real points in one column along a vertical direction into a pillar, wherein the pillar is provided with a pillar motion parameter, and each of the real points in the pillar has a motion parameter that is the same as the pillar motion parameter;
a prediction module configured to, for each of real points in a current frame, move the real point to a next frame based on a corresponding pillar motion parameter, to determine a predicted point in the next frame;
a loss determination module configured to determine a first loss term based on a minimum distance among distances between predicted points in the next frame and real points in the next frame, and generate a loss function comprising the first loss term; and
a processing module configured to perform self-supervised learning processing based on the loss function to determine a pillar motion parameter of the pillar.

14. A computer-readable storage medium storing a computer program that, when being executed by a processor, performs:
acquiring an unlabeled dataset, wherein the dataset comprises point clouds in a plurality of frames, and a point cloud in each of the plurality of frames comprises a plurality of real points;
organizing real points in one column along a vertical direction into a pillar, wherein the pillar is provided with a pillar motion parameter, and each of the real points in the pillar has a motion parameter that is the same as the pillar motion parameter;
for each of real points in a current frame, moving the real point to a next frame based on a corresponding pillar motion parameter, and determining a predicted point in the next frame;
determining a first loss term based on a minimum distance among distances between predicted points in the next frame and real points in the next frame, and generating a loss function comprising the first loss term; and
performing self-supervised learning processing based on the loss function to determine a pillar motion parameter of the pillar.

15. An electronic device, comprising:
a bus;
a transceiver;
a memory storing computer-executable instructions; and
a processor configured to execute the computer-executable instructions;
wherein the transceiver, the memory and the processor are connected to each other via the bus, and
wherein the computer-executable instructions include:
acquiring an unlabeled dataset, wherein the dataset comprises point clouds in a plurality of frames, and a point cloud in each of the plurality of frames comprises a plurality of real points;
organizing real points in one column along a vertical direction into a pillar, wherein the pillar is provided with a pillar motion parameter, and each of the real points in the pillar has a motion parameter that is the same as the pillar motion parameter;
for each of real points in a current frame, moving the real point to a next frame based on a corresponding pillar motion parameter, and determining a predicted point in the next frame;
determining a first loss term based on a minimum distance among distances between predicted points in the next frame and real points in the next frame, and generating a loss function comprising the first loss term; and performing self-supervised learning processing based on the loss function to determine a pillar motion parameter of the pillar.

\* \* \* \* \*